United States Patent [19]

Kurosawa et al.

[11] Patent Number: 4,756,549
[45] Date of Patent: Jul. 12, 1988

[54] SHOCK ABSORBER CONTROLLER

[75] Inventors: Ryuichi Kurosawa, Numazu; Hirohide Iwase, Mishima; Yukio Yamamoto, Susono; Ryushi Tanaka, Susono; Takashi Shirasu, Susono; Susumu Oda, Susono, all of Japan

[73] Assignee: Toyota Jidosha Kabushiki Kaisha, Aichi, Japan

[21] Appl. No.: 923,041

[22] Filed: Oct. 24, 1986

[30] Foreign Application Priority Data

Oct. 26, 1985 [JP] Japan .................. 60-239775
Jan. 16, 1986 [JP] Japan .................. 61-7509
Feb. 5, 1986 [JP] Japan .................. 61-23366
Oct. 21, 1986 [JP] Japan .................. 61-250419

[51] Int. Cl.$^4$ .......................... B60G 11/26
[52] U.S. Cl. .......................... 280/707; 180/41; 280/6 H; 280/DIG. 1
[58] Field of Search ........ 280/6 H, 6 R, 707, DIG. 1; 180/41; 318/611

[56] References Cited

U.S. PATENT DOCUMENTS

| | | | |
|---|---|---|---|
| 3,555,391 | 1/1971 | Younkin | 318/611 |
| 4,344,128 | 8/1982 | Frye | 318/611 |
| 4,491,207 | 1/1985 | Boonchanta | 188/299 |
| 4,589,676 | 5/1986 | Meloche et al. | 280/707 |
| 4,598,929 | 7/1986 | Kumagai et al. | 280/707 |
| 4,612,489 | 9/1986 | Gunda | 318/611 |
| 4,616,163 | 10/1986 | Kanai et al. | 280/707 |
| 4,696,489 | 9/1987 | Fujishiro et al. | 280/707 |

FOREIGN PATENT DOCUMENTS 0139145 5/1985 European Pat. Off. .
0197316 10/1986 European Pat. Off. .
1450765 9/1976 United Kingdom .

*Primary Examiner*—Kenneth R. Rice
*Attorney, Agent, or Firm*—Parkhurst & Oliff

[57] ABSTRACT

This controller controls a varible damping force shock absorber taking the cycle time and the oscillating phase of the body vibration. The controller increases the damping force when the body is moving toward its mean position. Before that, the damping force is kept weak so that the body vibration is hastened to become moving toward the mean position. Some criteria for determining that the body is moving toward its mean position are proposed.

11 Claims, 21 Drawing Sheets

FIG. 9A BODY HEIGHT A

FIG. 9B ACTUATOR DRIVE CURRENT

FIG. 9C DAMPING FORCE

FIG. 17A
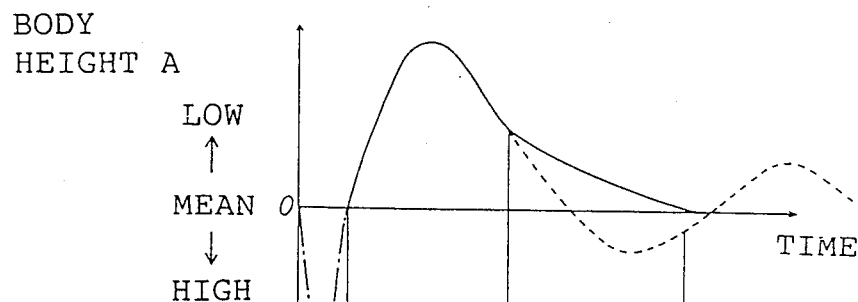
FIG. 17B
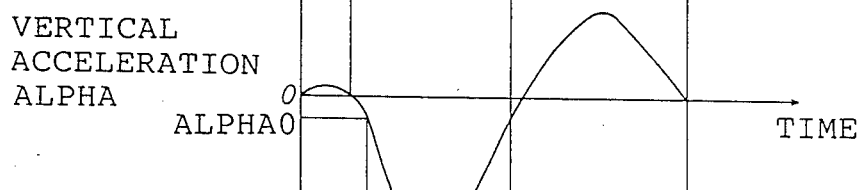
FIG. 17C
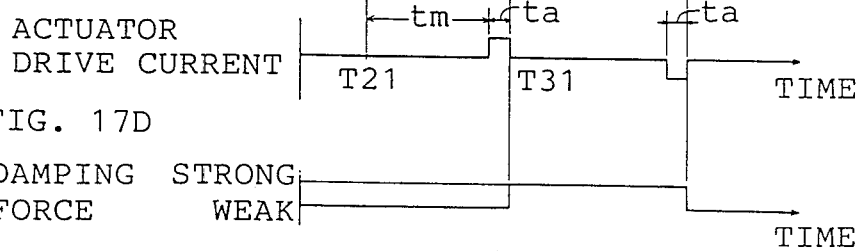
FIG. 17D
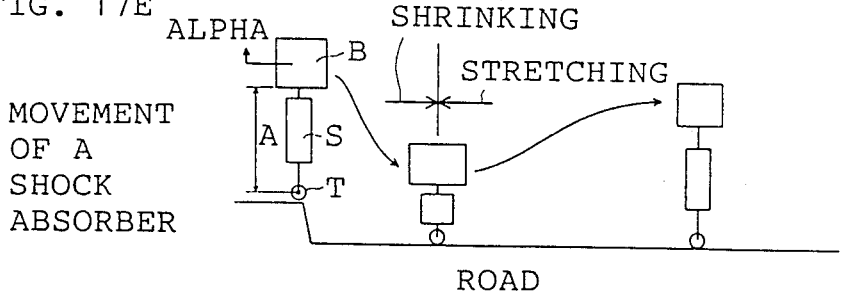
FIG. 17E

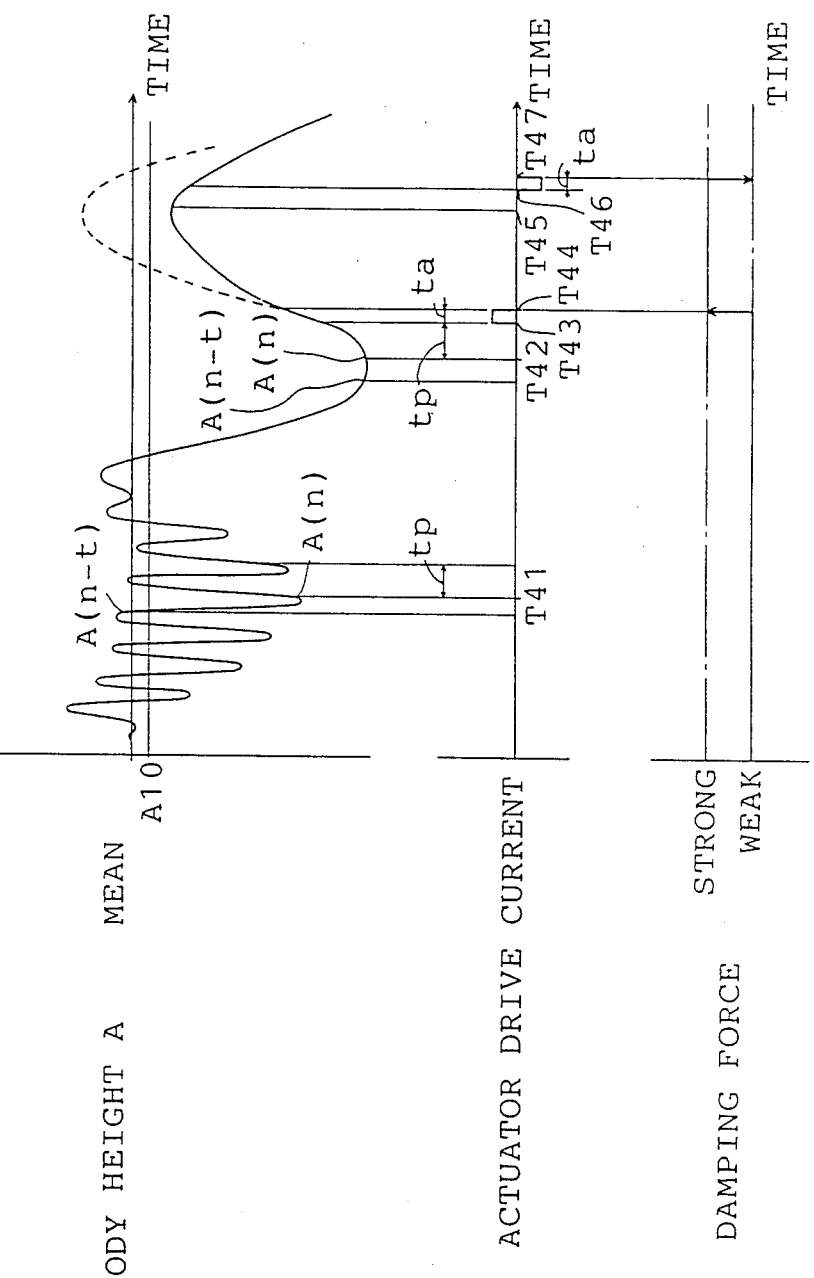

SHOCK ABSORBER CONTROLLER

BACKGROUND OF THE INVENTION

1. Field of the Invention

This invention relates to a controller for a shock absorber of a vehicle suspension whose damping force is made variable responsive to an outer command.

2. Prior Art

Many controllers for variable damping force shock absorbers have been proposed for various kinds of purposes. In order to stabilize the vehicle attitude, e.g., to prevent a squat, a nosedive or a roll of the body, a controller is proposed which increases the damping force in case of an abrupt start, an abrupt braking or a slaloming. Another controller aimed at ride comfort to decrease the damping force when the vehicle is cruising on a flat road and to increase it when running on a rough road for better damping efficiency of the body vibration. For altering the damping force, the Japanese Published Unexamined Patent Application No. Sho-59-23712, entitled as "Air Suspension Controller", discloses an apparatus for detecting the body condition or the road surface condition with proper sensors, for performing a predetermined algorithm with a computer based on the detected conditions and for altering the air suspension characteristic responsive to the calculation result. The alteration of the air suspension characteristic is realized by altering one of the following measures: the capacity of a surge tank provided at the air suspension; a throttle diameter of a throttle valve provided between the surge tank and an air spring; and the damping force of a shock absorber.

SUMMARY OF THE INVENTION

The object of the present invention is to solve some drawbacks arising along with the prior art. One of the drawbacks is that the alteration of the shock absorber damping force is performed according to a sensed road surface condition, but indifferent to the vibration cycle of the vehicle body. The damping force of the shock absorber is altered to a harder state or to a softer state for more than several cycle times of the body vibration. It means that the damping force is altered longer than is needed, resulting in a deterioration of the ride comfort by inadequate damping force setting of the shock absorber after the vibration has been subsided.

The damping force should more adequately be altered according to the oscillating phase of the shock absorber movement. Therefore an object of the invention is to control the damping force of the shock absorber taking the cycle time of the body vibration into consideration.

If the damping force is altered to a harder state before the oscillation reaches its maximum point, it takes more time to reach the maximum point, or more time until the vibration is subsided. Another object of the invention is to make a more subtle control of the damping force alteration timing, taking the oscillation phase of the body vibration into consideration.

The foregoing and other objects are attained by the shock absorber controller for a vehicle suspension according to the invention, whose principle is shown in FIG. 1, including:

vertical movement detection means M1 for detecting a vertical movement of a body of the vehicle;

control means M3 for generating a damping force alteration signal at a time point when the vehicle body is moving toward a mean position of the body; and damping force alteration means M2 responsive to the damping force alteration signal for increasing a damping force of the shock absorber.

Here the vertical movement detection M1 detect, for example, a distance between the vehicle body and a wheel, or a distance between the body and the road surface, to generate a body height signal proportionate to the distance. The vertical movement detection means M1, instead, may detect a vertical acceleration of the body movement to generate a vertical acceleration signal.

The damping force alteration means M2 may well adopt such a structure that it changes the paths of the oil flow in the shock absorber, altering the effective diameter of the oil path. Smaller diameter path realizes stronger damping force and vice versa. The damping force can be altered continuously or discretely according to adequate structure of the shock absorber.

The time point when the control means M3 generate the damping force alteration signal is set within the period in which the body is moving toward its mean position. The period is judged by many criteria, some of which is disclosed in the following description of the preferred embodiments of the invention and in the claims. For example, the time point may be determined to be a predetermined period after the body height passes its local maximum or local minimum but before the body height reaches the mean value. Alternatively, the time point may be determined to be a certain period after the body height exceeds a preset range including the mean value. Here, the period is determined based on the cycle time of the resonant vibration of the spring mass, or the body, so that the time point falls within the period in which the body is moving toward the mean position, since the vibration of the body is usually close to the resonant vibration indifferent to the amplitude of the vibration. The time point may be determined, instead, to be at which the body height returns within a predetermined range after it attains its local maximum or local minimum. Further, the movement of the body can be judged with the vertical acceleration of the body movement. In that case, the time point can be determined to be a preset period after the vertical acceleration exceeds a predetermined range including zero. Another possible determination method is, similarly to the above case, that the time point is set after the acceleration attains its local maximum or local minimum.

The damping force alteration means M2 alters the damping force of the shock absorber to a stronger state when receiving the damping force alteration signal from the control means M3. Before that time point, the damping force is in a weaker state, which shortens the period for the body to reach the farthest displacement. After the damping force is increased, the control means M3, of course, determines an adequate time point when to return the altered damping force to the original state and generate the corresponding control signal to the damping force alteration means M2. Thus the damping force of the shock absorber is altered adequately within a semi-cycle time of the body vibration and the vibration can be subsided within the semi-cycle time, leading to the ride comfort of the vehicle.

BRIEF DESCRIPTION OF THE DRAWINGS

The invention may be best understood by refering to the following detailed description of the preferred embodiments and the accompanying drawings, wherein like numerals denote like elements, in which:

FIGS. 4A, 4B and 4C integrally show a weak damping force condition of a shock absorber of the first embodiment, in which FIGS. 4A and 4C are vertical sectional figures and FIG. 4B shows a direction of a damping force alteration actuator;

FIGS. 9A, 9B and 9C are timing charts corresponding to the operations of the first embodiment, in which FIG. 9A is that of the body height, FIG. 9B is of the actuator drive current and FIG. 9C is of the damping force of the shock absorber;

FIGS. 15A, 15B, 15C, 15D and 15E are timing charts corresponding to the operations of the third embodiment, in which FIG. 15A is that of the body height, FIG. 15B is of the vertical acceleration of the body, FIG. 15C is of the actuator drive current, FIG. 15D is of the damping force of the shock absorber and FIG. 15E is of the movement of the shock absorber;

FIGS. 17A, 17B, 17C, 17D and 17E are timing charts corresponding to the operations of the fourth embodiment;

FIGS. 19A, 19B and 19C are timing charts corresponding to the operations of the fifth embodiment.

DETAIL DESCRIPTION OF THE PREFERRED EMBODIMENTS

Set forth below is an explanation of preferred embodiments of the present invention in reference to the drawings.

Figure 1:
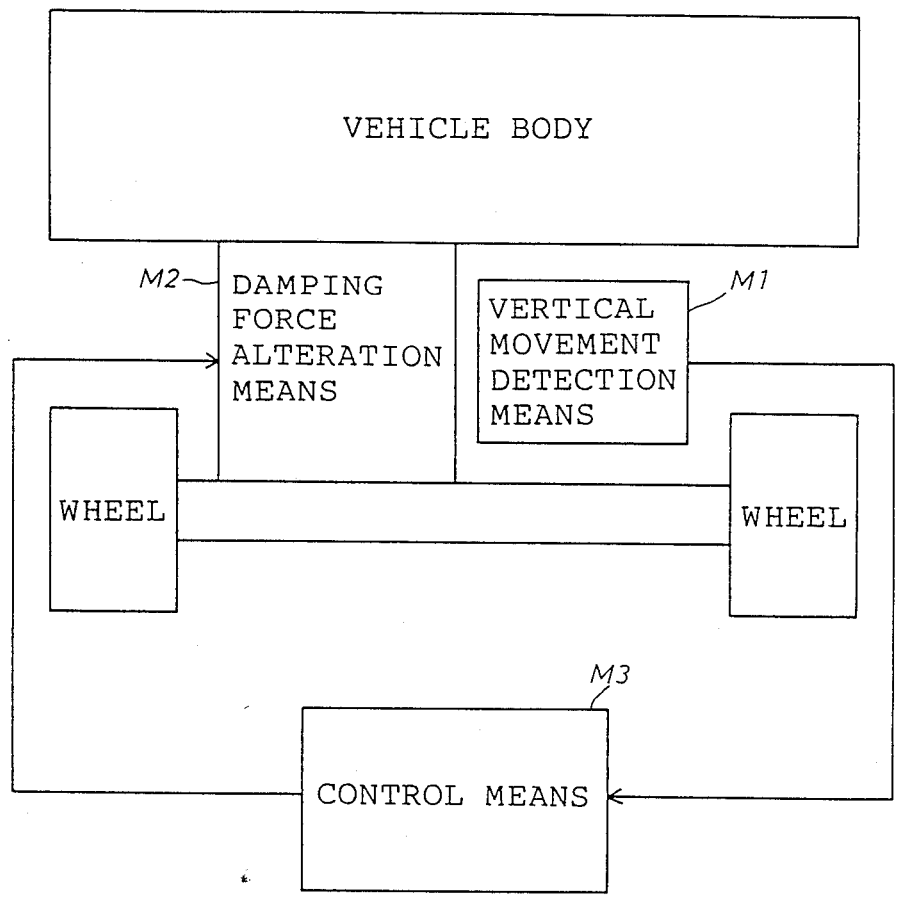
FIG. 1 is a diagram showing the principle of the invention.
Figure 2:
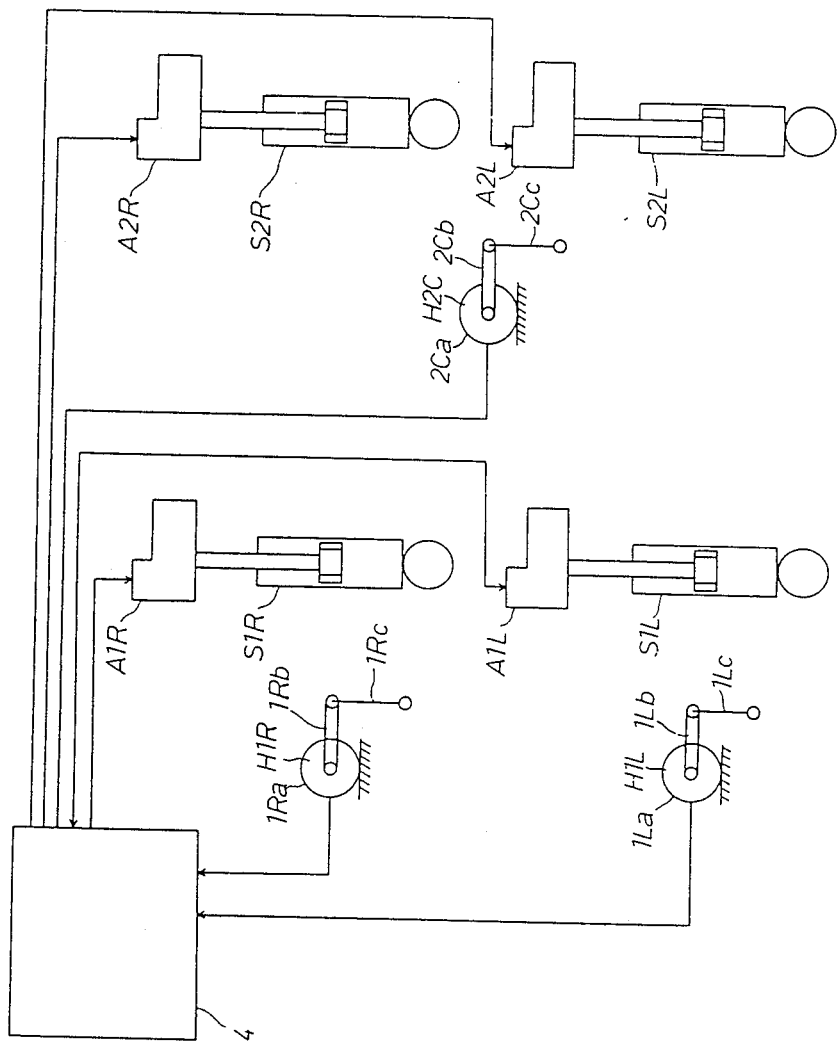
FIG. 2 is a system diagram of the first embodiment of the invention.
Figure 3A:
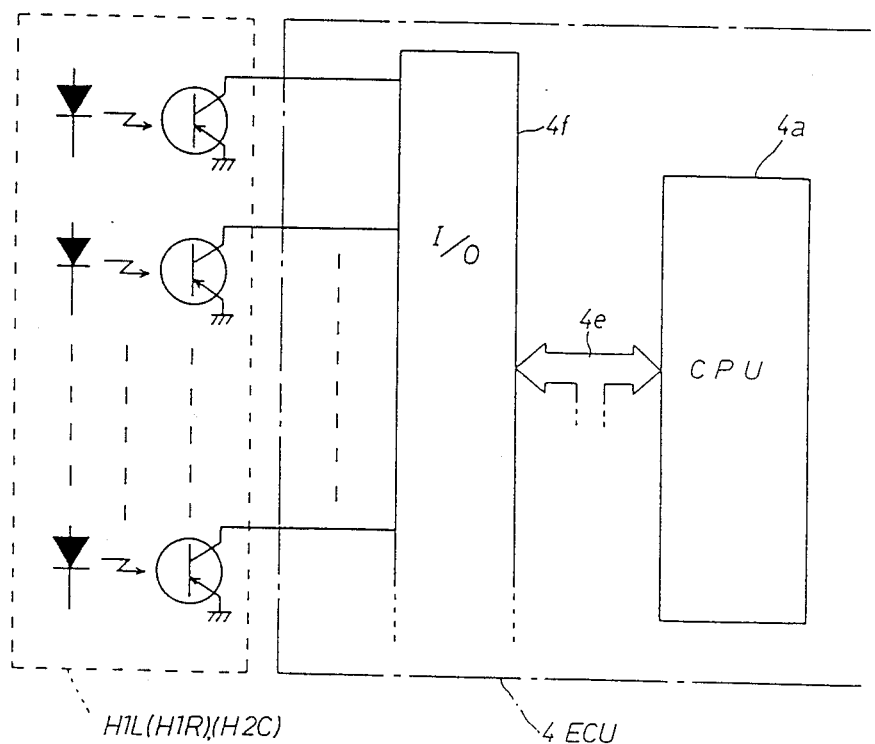
FIG. 3A shows a construction of a digital type body height sensor and the corresponding electronic control unit (ECU) and FIG. 3B shows that of an analogue type sensor and the ECU.
Figure 3B:
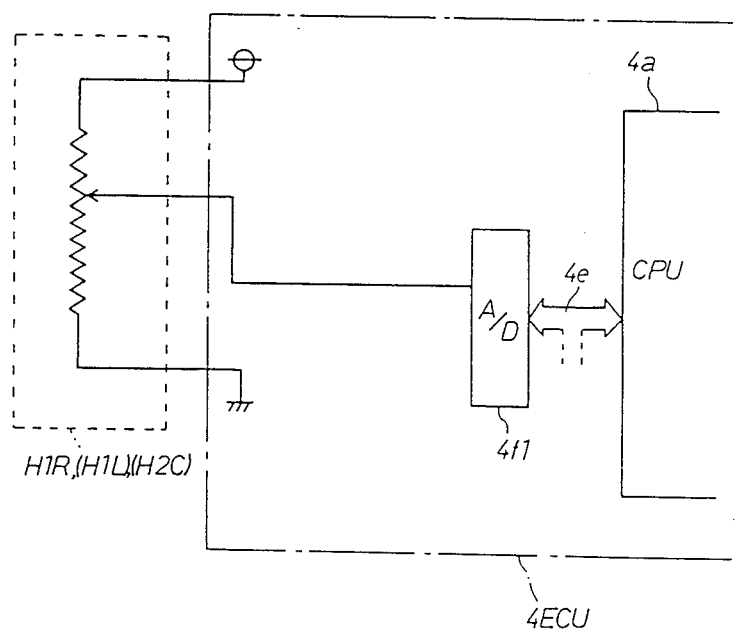

FIG. 2 is a system diagram of a shock absorber control system of the first embodiment. Left and right front vehicle height sensors H1L and H1R and a rear body height sensor H2C are provided between the vehicle body and the wheels to detect the distance between the body and each of the suspension arms which follow the vertical motion of the wheels. The short cylindrical bodies 1La, 1Ra and 2Ca of the body height sensors H1L, H1R and H2C are secured on the vehicle body. Links 1Lb, 1Rb and 2Cb are extending from the center shafts of the sensor bodies 1La, 1Ra and 2Ca almost perpendicularly to the centers shafts. End portions of the links 1Lb, 1Rb and 2Cb opposite to the sensor bodies are rotatably coupled to one end of the turnbuckles 1Lc, 1Rc and 2Cc. The other end of the turnbuckles 1Lc, 1Rc and 2Cc opposite to the links are rotatably coupled to portions of the suspension arms. Each of the sensors H1L, H1R and H2C is equipped with a well-known rotary encoder. As shown in FIG. 3A, each of the sensors is connected to an electronic control unit (ECU) 4, and outputs digital signals indicating the the body height. The body height sensors H1L, H1R and H2C may employ a well-known potentiometer instead of the rotary encoder. In this case, as shown in FIG. 3B, the analog signal generated in the potentiometer is required to be converted into a digital signal by an A/D converter 4f1 so as it may be processed in the ECU 4.

In reference to FIG. 2, shock absorbers S1L, S1R, S2L and S2R are respectively provided between the vehicle body and the suspension arms of left front wheel, right front wheel, left rear wheel and right rear wheel besides respective suspension apparatuses (not shown). Damping force alteration actuators A1L, A1R, A2L and A2R are installed on the above-mentioned shock absorbers S1L, S1R, S2L and S2R. The signals outputted from the body height sensors H1L, H1R and H2C are inputted into the ECU 4, which controls the damping force alteration actuators A1L, A1R, A2L and A2R.

Figure 4C:
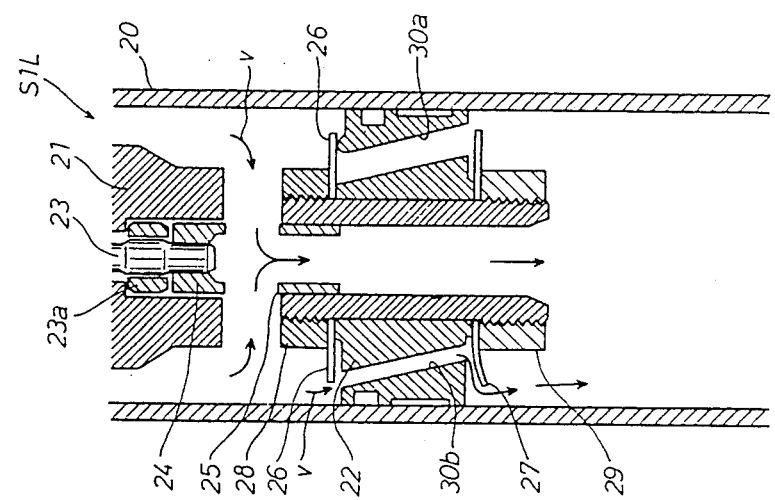

Since all of the shock absorbers S1L, S1R, S2L and S2R have the same construction, one of them, S1L, is explained hereafter. As shown in FIG. 4A, the shock absorber S1L includes a hollow piston rod 21 within an outer cylinder 20 and a piston 22 which is slidably fitted into the outer cylinder 20. A control rod 23 is provided in the piston rod 21, and is supported by guide members 23a which are fixed in the piston rod 21. The control rod 23 is rotated by the damping force alteration actuator A1L so as to drive the rotary valve 24 fixed to the control rod 23, and thus an orifice 25 is opened or closed. Plate valves 26 and 27 are fixed to the piston 22 by nuts 28 and 29 respectively.

Figure 4B:
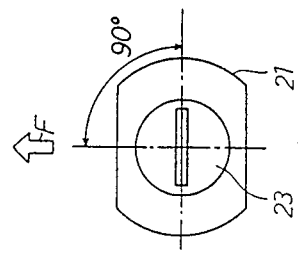
Figure 4A:
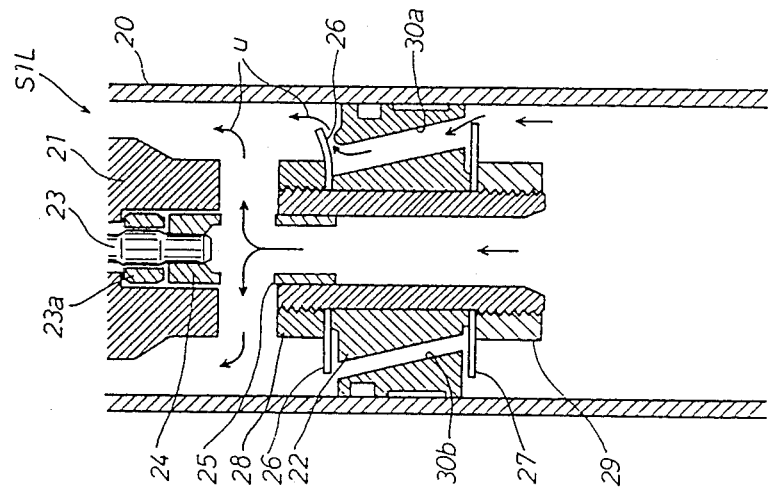

When the piston rod 21 and the control rod 23 are positioned as shown in FIG. 4B, that is, the control rod 23 is positioned perpendicularly to the front direction indicated by an arrow F, the orifice 25 is opened. As shown in FIG. 4A, in the contracting phase of the shock absorber, the plate valve 26 is opened to allow oil flow through a passage 30a. On the other hand, in the expanding phase, the plate valve 27 is opened to allow oil flow through a passage 30b. Thus, in the contracting phase, oil flows through both the orifice 25 and the passage 30a in the direction of arrow u in FIG. 4A, and in the expanding phase, the oil flows through both the orifice 25 and the passage 30b in the direction of arrow v in FIG. 4C. Since the flow resistance of the oil is small, the damping force of the shock absorber S1L is set to a small value.

Figure 5C:
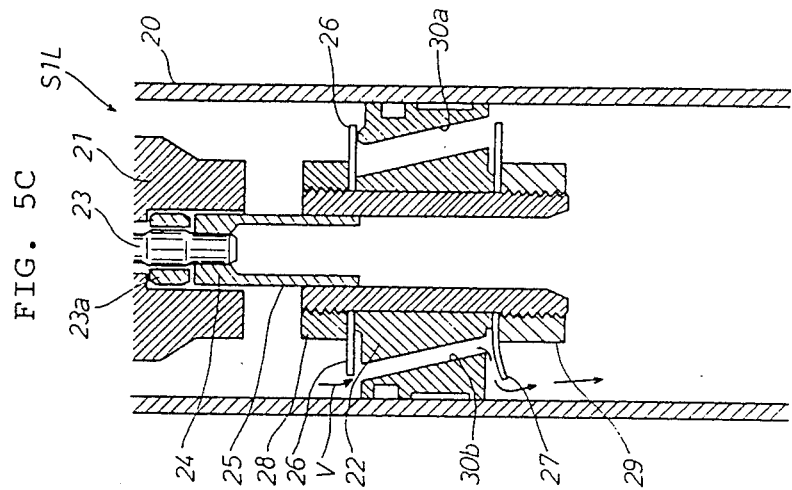
FIG. 5A, 5B and 5C integrally show a strong damping force condition of the shock absorber.
Figure 5B:
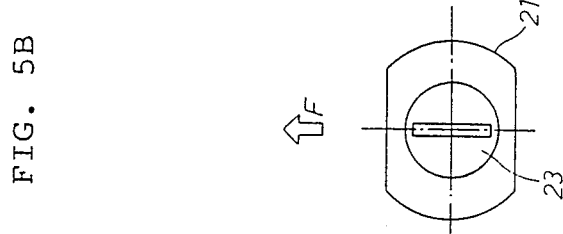
Figure 5A:
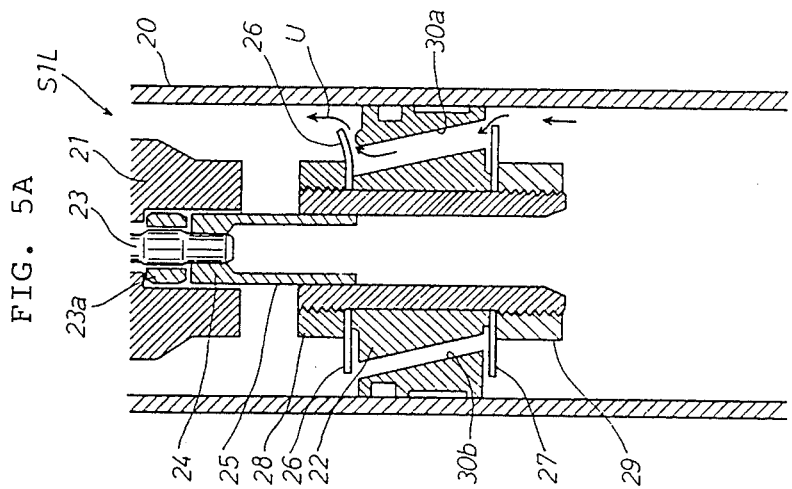

On the other hand, when the piston rod 21 and the control rod 23 are positioned as shown in FIG. 5B, that is, the control rod 23 is positioned in parallel with the front direction shown by an arrow F, the orifice 25 is closed by the rotary valve 24. Thus, in the contracting phase, oil flows through passage 30a only in the direction of arrow U as shown in FIG. 5A, and in the expanding phase, the oil flows through passage 30b only in the direction of arrow V as shown in FIG. 5C. In this case, the flow resistance of the oil is large, and the damping force of the shock absorber S1L is set to a large value.

Figure 6:
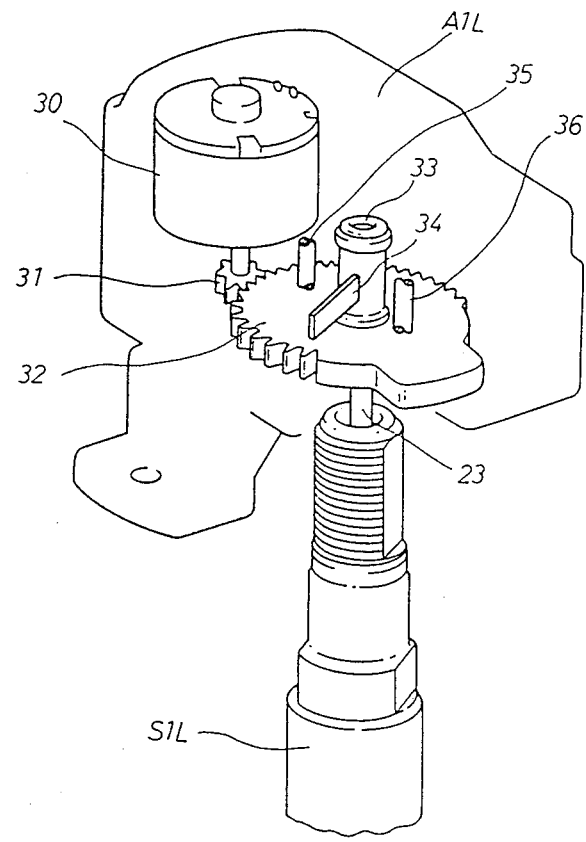
FIG. 6 is a perspective view of the damping force alteration actuator.

Since all of the damping force alteration actuators A1L, A1R, A2L and A2R have the same construction, the actuator A1L is representatively explained based on FIG. 6. The damping force alteration actuator A1L includes a direct current (DC) motor 30, a pinion gear 31 attached to of the motor 30 and a sector gear 32 which is engaged with the pinion gear 31. The control rod 23 is attached at the center of the sector gear 32. When the DC motor 30 is rotating in normal and reverse directions in accordance with the drive control of the ECU 4, the control rod 23 with the rotary valve 24 rotates in normal and reverse directions, thereby the orifice 25 is opened and closed so as to alter the damping force of the shock absorber S1L. The rotation angle of the control rod 23 is limited to within 90°, since the maximum rotation of lever 34 fixed to the center shaft 33 of the sector gear 32 is limited to 90° in right and left by stoppers 35 and 36 each of which is positioned at right angles to the lever on the right and left hand sides respectively.

Figure 7:
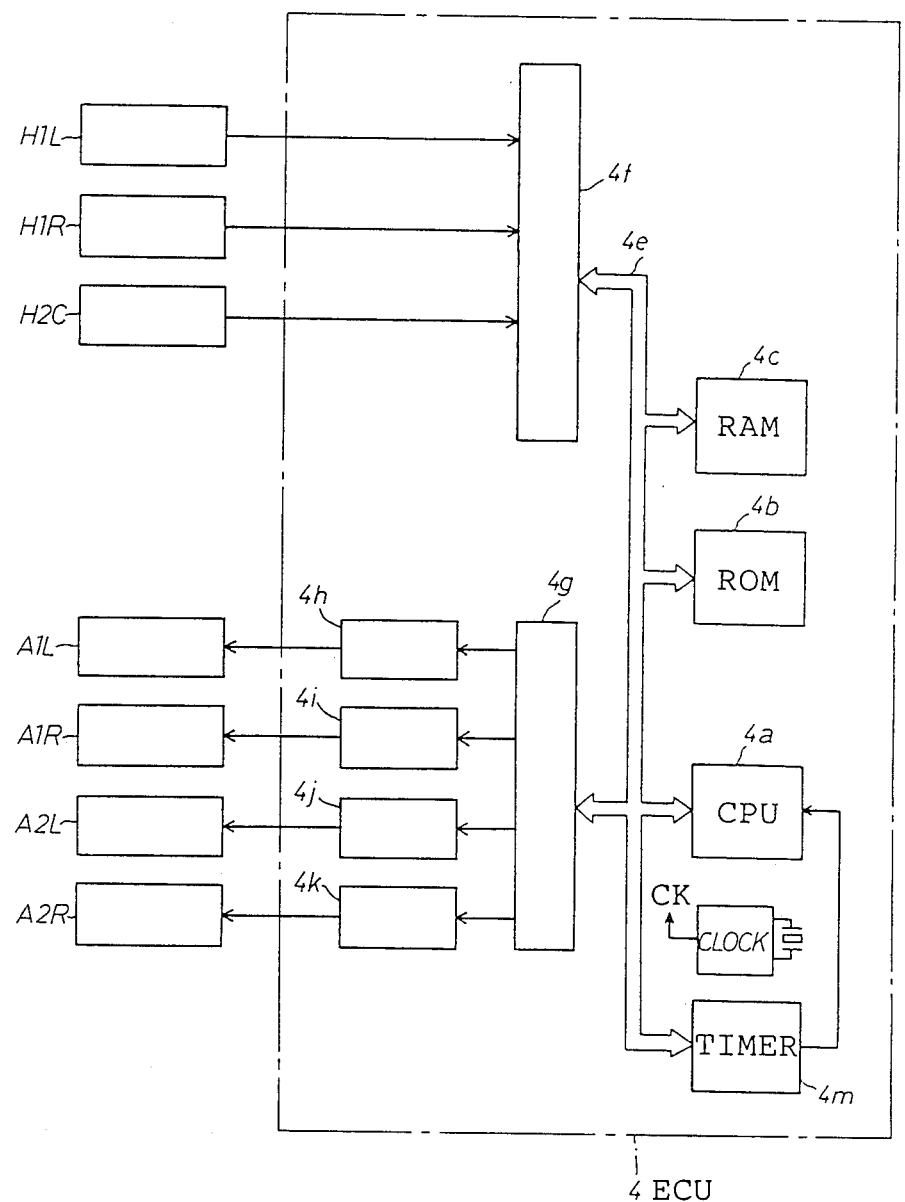
FIG. 7 is a block diagram of the ECU.

FIG. 7 is a block diagram of the ECU 4. The ECU 4 is a logic circuit primarily consisting of a CPU 4a, a ROM 4b and a RAM 4c. The CPU 4a receives data outputted from various sensors, calculates in accordance with a control program and performs processings for the control of the operation of various units. The control program and initial data are previously stored in the ROM 4b. The data which are inputted into the ECU 4, and data which are necessary for calculation and control, are temporarily stored in the RAM 4c. The ECU 4 includes an input port 4f and an output port 4g for communicating with the outside apparatuses and a common bus 4e for transmitting data within the ECU 4. Signals outputted from the body height sensors H1L, H1R and H2C are inputted into the CPU 4a via the input port 4f. Furthermore, the ECU 4 includes driving circuits 4h, 4i, 4j and 4k of the damping force alteration actuators A1L, A1R, A2L and A2R. The CPU 4a outputs control signals to the driving circuits 4h, 4i, 4j and 4k via the output port 4g. The ECU 4 also includes a timer 4m which provides an interruption timing signal to the CPU 4a when a predetermined time interval has passed.

Figure 8:
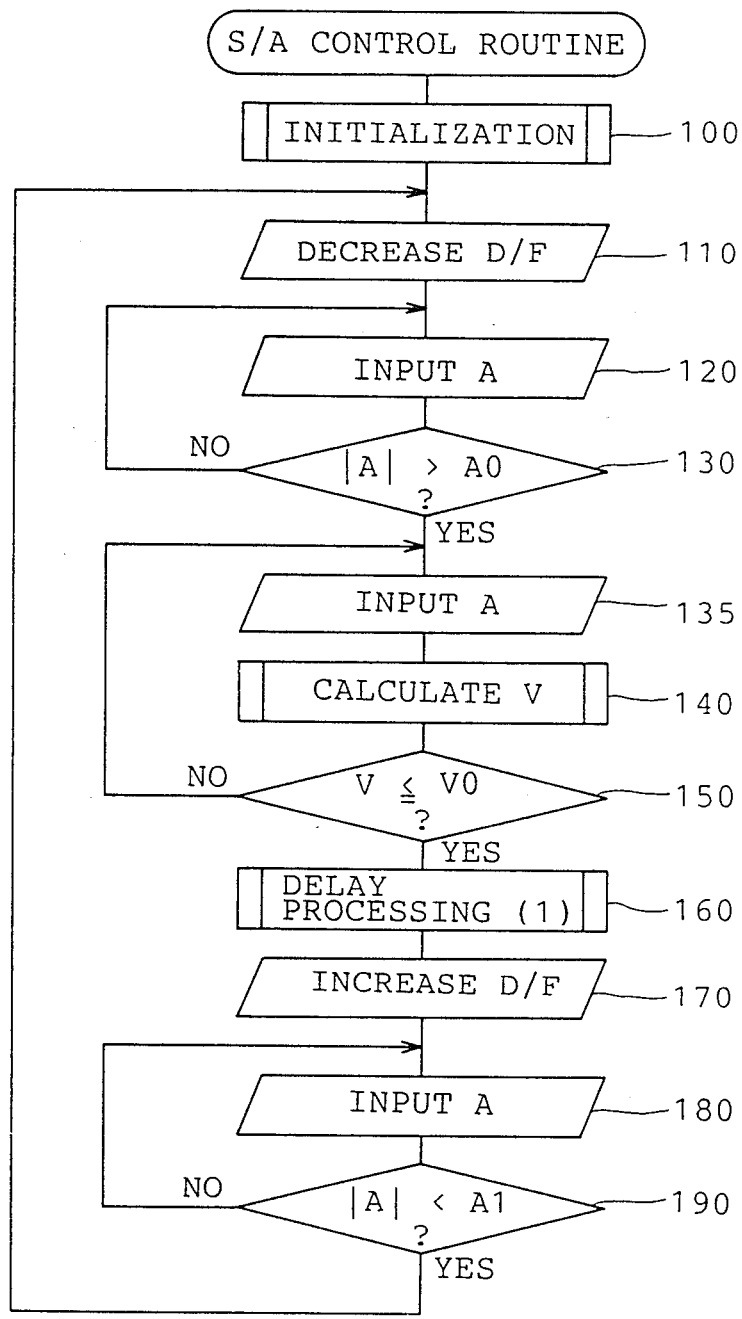
FIG. 8 is a flow chart of a shock absorber (S/A) control routine executed by the ECU in the first embodiment.

The shock absorber (S/A) control routine executed by the aforementioned ECU 4 will be explained based on a flow chart of FIG. 8. This routine is executed after the ECU 4 was initiated.

The initialization is executed at step 100, i.e., memory is cleared, and a timer and registers for storing a body height value A and a body height change speed V are reset to zero. At step 110, the damping force (D/F) is decreased, or altered to a weaker state. Namely, the damping force alteration actuators A1L, A1R, A2L and A2R are activated to rotate the motor 30 counterclockwise (CCW), so that the control rod 23 with the rotary valve 24 is rotated to open the orifice 25.

The body height A is inputted at step 120. Here, the body height A may be the maximum value among output signals detected from the left front body height sensor H1L, the right front body height sensor H1R and the rear body height sensor H2C, may be the mean value of the left and right body height values or may be detected from a predetermined body height sensor. The program cycle then proceeds to the decision point 130 at which the absolute value of the body height A inputted at step 120 is compared with a reference value A0 (30 mm in this embodiment). If the absolute value of A is determined to be less than or equal to the reference value A0, the program returns to step 120, where the body height A is again inputted. On the contrary, if the absolute value of A is determined to be greater than A0, it is judged that the vehicle attitude is largely changed and the program proceeds to step 135 where the body height A is inputted in the same manner as step 120. At the following step 140, the body height change speed V is computed. The speed V is computed by subtracting the current body height $A_n$ from the last body height $A_{n-1}$. The program cycle then proceeds to the decision point 150 at which the body height change speed V is compared with a reference speed V0. Since it was determined at the decision point 130 that the body height A is greater than the reference value A0, a time point at which the body height value A attains the first local maximum is determined based on the body height change speed V. The speed V gradually decreases until the body height value attains the maximum. Since the speed V is zero when the body height is at the maximum, the reference speed V0 is set to 0 mm/sec in this embodiment. When the speed V is determined to be greater than the reference speed V0, it is judged that the body height has not yet attained the maximum and the program returns to step 140, where the body height change speed V is again computed. On the other hand, when the speed V is determined to be less than or equal to the reference speed V0, it is judged that the body height has attained the maximum and the program proceeds to step 160.

At step 160, a delay processing (1) is executed. Namely, the ECU 4 waits to increase the damping force, or alter the damping force to a stronger state, for a predetermined delay time interval tb. The damping force is actually altered to the stronger state after an effective delay time interval td has elapsed since the timer point at which the body height value A attained the maximum. The effective delay time interval td is calculated by an equation (1):

$$td = tb + ta \qquad (1)$$

tb ... a delay time interval
ta ... an actuator operation time period for altering the damping force The above effective delay time interval td varies depending upon the vehicle and the reference value A0 and is preferably within the range between 20 and 300 msec (around 200 msec is optimal for a normal vehicle). In this embodiment, the time period ta is 60 msec and the delay time interval tb is set to 100 msec so that the effective delay time interval td is 160 msec.

When the time is counted by the timer 4m and the delay time interval tb has elapsed, the program proceeds to step 170 where the damping force is altered to the stronger state. Namely, the damping force alteration actuators A1L, A1R, A2L and A2R are activated to rotate the motor 30 clockwise (CW), so that the control rod 23 with the rotary valve 24 is rotated to shut off the orifice 25.

At step 180, the body height A is inputted. The program then proceeds to the decision point 190 at which the absolute value of A inputted at step 180 is compared with a reference value A1 (in this embodiment A1 is 5 mm). Here, the value A1 is set close to a mean body height. If the absolute value of A is determined to be greater than or equal to the reference value A1, it is judged that the body height has not yet returned to the mean value and the program returns to step 180, where the body height A is again inputted. On the contrary, if the absolute value of A is determined to be less than the reference value A1, it is judged that the body height has already returned to the mean value and the program returns to step 110, where the damping force is again altered to the weaker state. Hereafter, the above-mentioned process steps are repeatedly executed.

Figure 9:
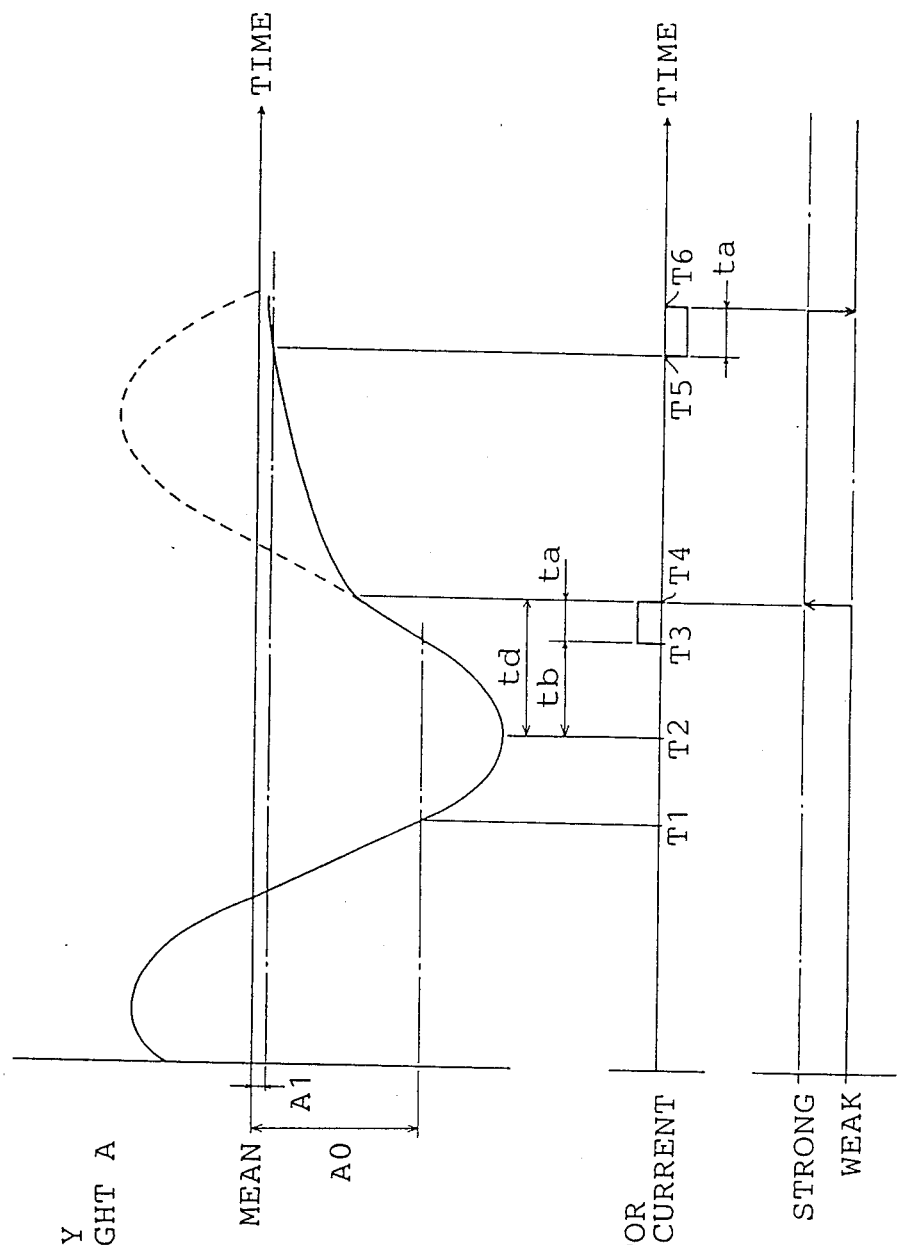

One example of the shock absorber control described above is now explained based on timing charts of FIGS. 9A, 9B and 9C. When a wheel rides over an obstacle or a vehicle attitude is abruptly changed by the driving condition, the body height A is largely changed and becomes distant from the mean body height. T1 is a time point at which the body height A becomes greater than the reference value A0. After the time point T1, the body height A gradually increases, and at a time point T2, attains the maximum value. At a time point T3 after the delay time interval tb has elapsed since the time point T2, the damping force alteration actuators A1L, A1R, A2L and A2R are activated. At a time point T4 after the actuator operation time period ta has elapsed since the time point T3, the damping force of the shock absorbers S1L, S1R, S2L and S2R is altered to the stronger state. In other words, T4 is a time point after the effective delay time interval td has elapsed since the time point T2 at which the body height attained maximum.

If the damping force is not changed and is remained n the weaker state, the body height is largely changed as shown in a dashed line. Since the damping force was, however, altered to the stronger state at the time point T4, the body height vibration is subsided as shown in a full line. At the time point T5, at which the body height becomes less than the reference value A1, the damping force alteration actuators A1L, A1R, A2L and A2R are activated, and at a time point T6 after the time period ta has elapsed since the time point T5, the damping force is altered to the weaker state. Hereafter, when the body height A becomes greater than the reference value A0, the damping force is altered to a stronger state after the effective delay time interval td has elapsed since the time point at which the body height attained maximum. On the other hand, when the body height A becomes less than the reference value A1, the damping force is altered to a weaker state.

In this embodiment, the front body height sensors H1L and H1R, the rear body height sensor H2C, the ECU 4 and the process steps 120 and 135 executed by the ECU 4 function as the vertical movement detection means M1. The shock absorbers S1L, S1R. S2L and S2R and the damping force alteration actuators A1L, A1R, A2L and A2R function as the damping force alteration means M2. The ECU 4 and the process steps 130, 140, 150, 160 and 170 executed by the ECU 4 function as the control means M3.

As described above in detail, in this embodiment, when the body height A, inputted from the body height sensors H1L, H1R and H2C, becomes greater than the reference value A0, the time point at which the body height attains maximum is determined based on the body height change speed V. After the effective delay time interval td has elapsed, the damping force is altered to a stronger state, and when the body height A becomes less than the reference value A1, the damping force is altered to a weaker state. Thus, from when the body height crosses the mean value and until when the delay time interval td elapses after the time point at which the body height attained maximum, the damping force is remained in the weaker state so as to hasten the body height change. After the effective delay time interval td has elapsed, the damping force is altered to the stronger state so as to subside the body height vibration. Since the large body height change can be controlled within a half cycle of the body height vibration and the body height can return to the mean value promptly, the ride comfort is maintained.

In this embodiment, only when the body height A becomes greater than the reference value A0, the damping force is altered to the stronger state within a half cycle time of the body height vibration so as to reduce the vibration. Namely, the damping force is not altered in response to a small vibration which does not need the vibration control, thus improving the durability of the shock absorbers S1L, S1R, S2R and S2R and the damping force alteration actuators A1L, A1R, A2L and A2R.

In the first embodiment, the damping force is altered to the stronger state after the effective delay time interval td has elapsed since the time point at which the body height A attains maximum. A variation of the above embodiment is then shown. The damping force can be altered to the stronger state when the body height A, for example, comes within a predetermined range around the mean value after the body height A attained maximum. In this case, the predetermined range is preferably altered corresponding to the attained maximum value of the body height A.

Figure 10:
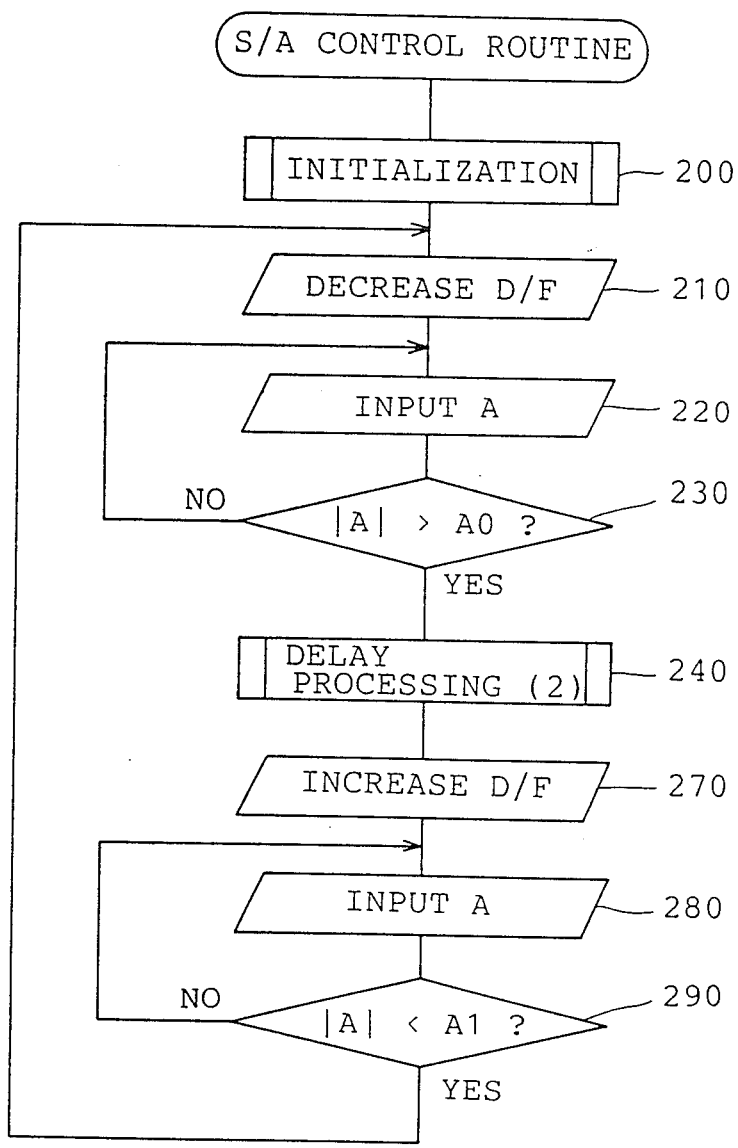
FIG. 10 is a flow chart of a shock absorber (S/A) control routine for the second embodiment.

A second embodiment is now explained. In the second embodiment, although the shock absorber control routine is different from that of the first embodiment, other features are the same as the first one. The shock absorber control routine of the second embodiment is explained based on a flow chart of FIG. 10. The process steps 200, 210, 220, 230, 270, 280 and 290 of the second embodiment correspond to the process steps 100, 110, 120, 130, 170, 180 and 190 of the first embodiment. The program enters the routine at step 200 where the initialization is executed. At step 210, the damping force of the shock absorbers S1L, S1R, S2L, S2R is altered to a weaker state, and at step 220, a body height A is inputted. The program cycle proceeds to the decision point 230 at which the absolute value of A is compared with a reference value A0. If $|A| > A0$, the program proceeds to step 240 and if not, returns to step 220.

At step 240, a delay processing (2) is executed. Namely, the ECU 4 waits to alter the damping force to a stronger state for a predetermined delay time interval te. The damping force is actually altered to the stronger state after an effective delay time interval tf has elapsed since the time point at which the body height value A attained the maximum. The effective delay time interval tf is calculated as equation (2):

$$tf = te + ta \qquad (2)$$

te . . . a delay time interval ta . . . an actuator operation time period for altering the damping force The above effective delay time interval tf varies depending upon the vehicle and the reference value A0 and is preferably within the range between 20 and 500 msec (around 300 msec is optimal for a normal vehicle). In this embodiment, the time period ta is 60 msec and the delay time interval te is set to 240 msec so that the effective delay time interval td is 300 msec.

When the time is counted by the timer 4m and the delay time interval te has elapsed, the program proceeds to step 270 where the damping force of the shock absorbers S1L, S1R, S2L and S2R is altered to the stronger state. At step 280, the body height A is inputted. The program then proceeds to the decision point 290 at which the absolute value of A inputted at step 280 is compared with a reference value A1. Here, the value A1 shows a mean body height. If $|A| < A1$, the program returns to step 210 and if not, to step 280. Hereafter, the above-mentioned process steps are repeatedly executed.

Figure 11:
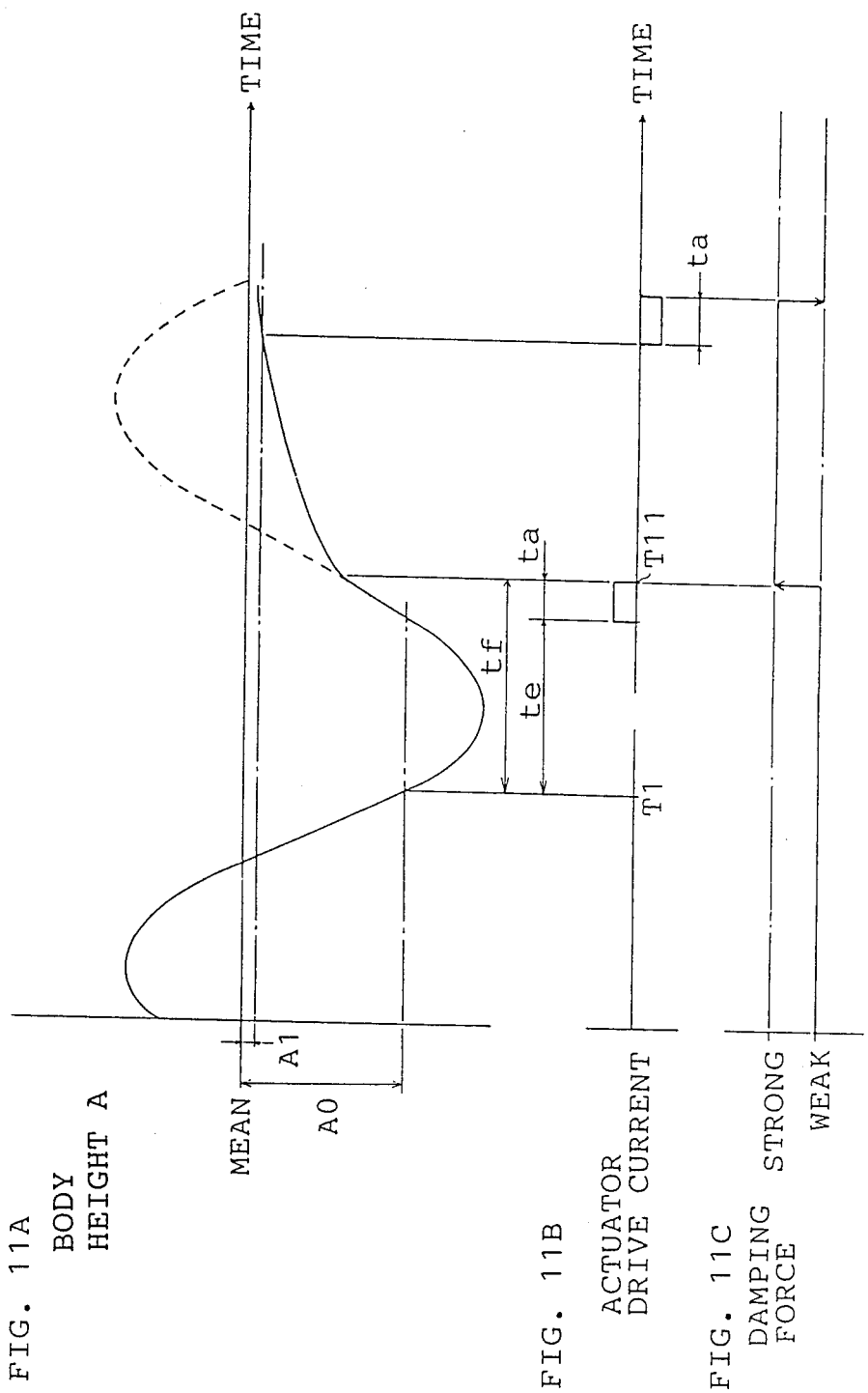
FIGS. 11A, 11B and 11C are timing charts corresponding to the operations of the second embodiment.

One example of the shock absorber control described above is now explained based on timing charts of FIGS. 11A, 11B and 11C. In the second embodiment, not the same as the first embodiment, at a time point T11 after the effective time interval tf has elapsed since a time point T1 at which the body height A becomes greater than the reference value A0, the damping force of the shock absorbers S1L, S1R, S2L and S2R is altered to a stronger state. Namely, in the second embodiment, the time point T11 at which the damping force is altered to the stronger state is determined by using the fact that natural vibration cycle of the vehicle body is almost constant and is close to the resonant vibration of the body indifferent to its amplitude.

As described above in detail, in the second embodiment, if the body height A, inputted from the body height sensors H1L, H1R and H2C, is determined to be greater than the reference value A0, the damping force is altered to a stronger state after the effective delay time interval tf has elapsed, and when the body height A is determined to be less than the reference value A1, the damping force is altered to a weaker state. For this reason, although the second embodiment has the effect similar to the first embodiment, the feature of the second one is simpler than the first one.

Figure 12:
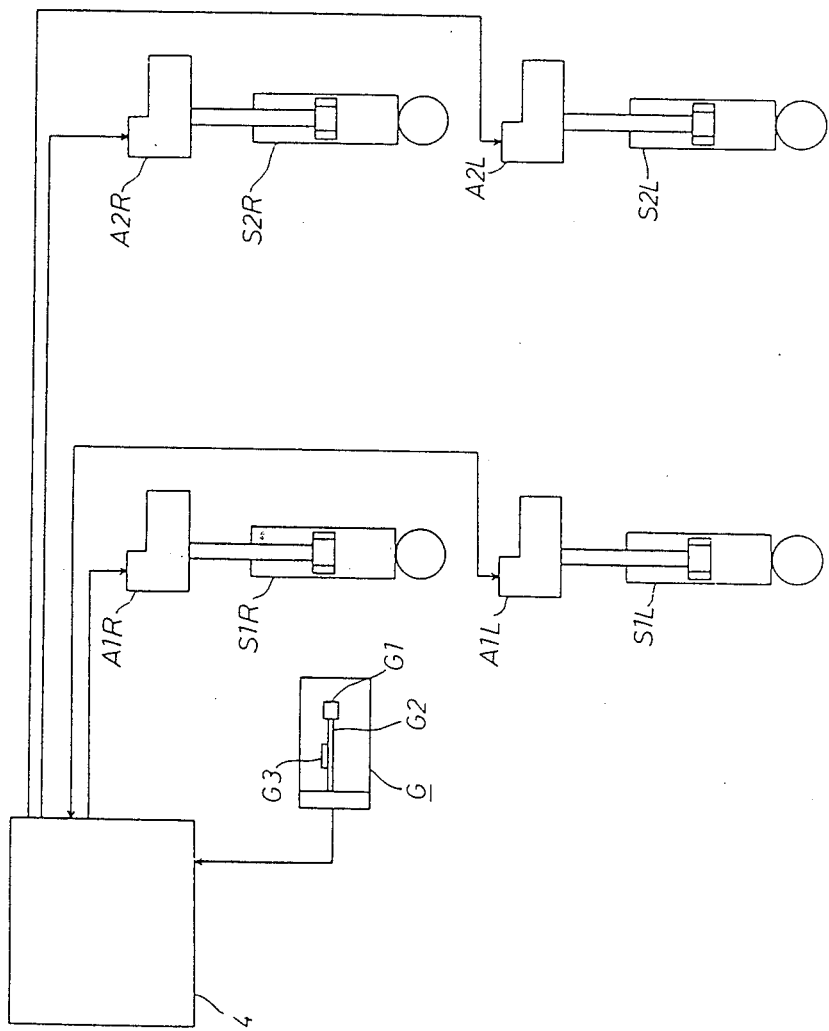
FIG. 12 is a system diagram of the third embodiment of the invention.
Figure 13:
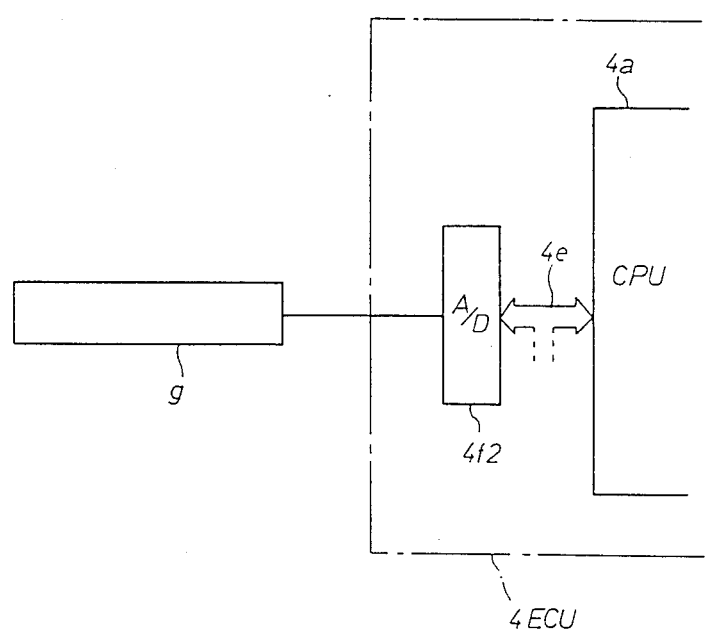
FIG. 13 shows a construction of an acceleration sensor and the corresponding ECU of the third embodiment.

FIG. 12 is a system diagram of a shock absorber control system in the third embodiment of the present invention.

In this embodiment, four shock absorbers S1L, S1R, S2L and S2R are employed, and each of them is equipped with damping force alteration actuators A1L, A1R, A2L and A2R respectively, in the same manner as in the first embodiment. Moreover, an acceleration sensor G for the sprung mass, i.e., the body mass, is provided to the vehicle body for detecting the acceleration of the vehicle body (sprung mass) in the vertical direction caused by the bouncing of the body. The acceleration sensor G is one of the piezoelectric type. The mechanism is as follows. When the vehicle body is accelerated, an elastic plate G2 is bent and a piezoelectric element G3 which is made of a ceramic and attached on a surface of the plate G2 is distorted due to the inertia of a weight G1. The distortion of the piezoelectric element G3 generates thereby an electric signal in proportion to the acceleration.

The signal generated in the acceleration sensor G is inputted into the ECU 4, which processes the signal according to a preset program so as to drive the damping force alteration actuators A1L, A1R, A2L and A2R. The construction of the ECU 4 in this embodiment is almost same as in the first embodiment, except that an A/D converter 4f2 is employed in this third embodiment. The analog signal detected by the acceleration sensor G is converted into a digital signal by the A/D converter 4f2 and is inputted into the CPU 4a.

When the analog signal detected by the acceleration sensor G includes high-frequency noise component, it is possible to remove the noise component using an appropriate low-pass filter before the signal is inputted to the ECU 4.

Figure 14:
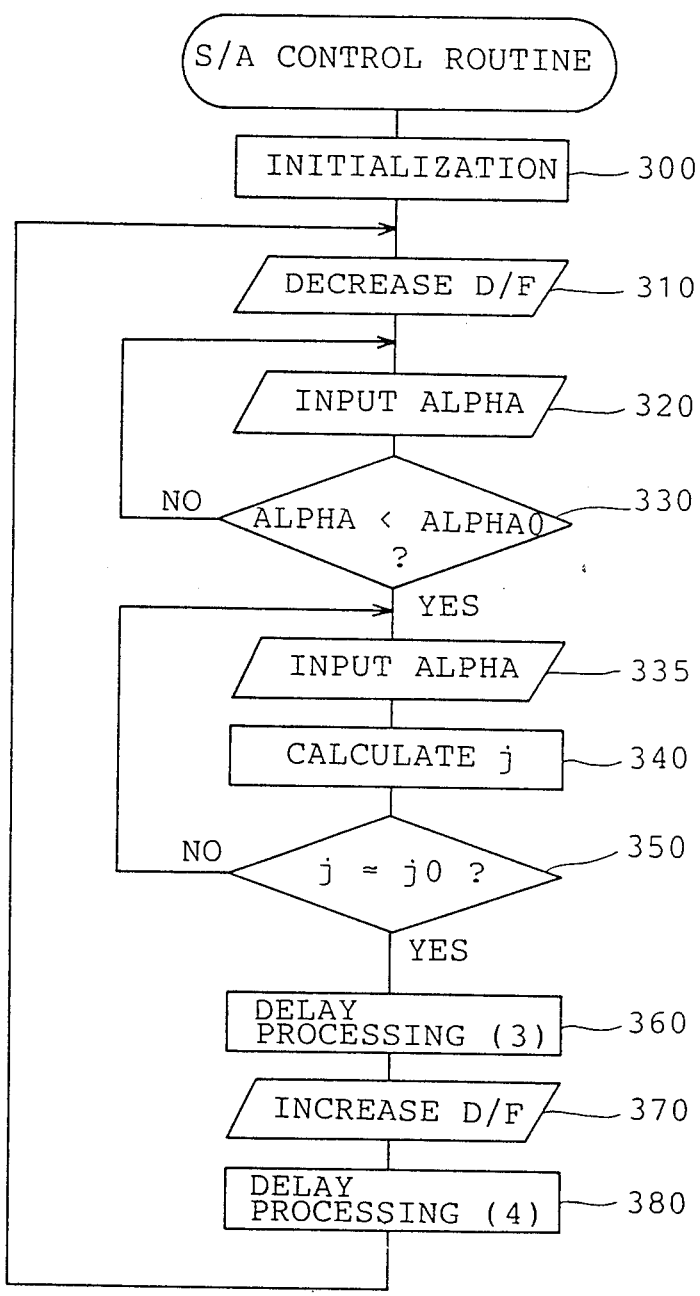
FIG. 14 is a flow chart of a shock absorber (S/A) control routine for the third embodiment.

The shock absorber control routine of the third embodiment executed by the ECU 4 is explained based on a flow chart of FIG. 14. The process steps 300, 310, 370 of the third embodiment corresponds to the process steps 100, 110 and 170 of the first embodiment. The program enters the routine at step 300 where the initialization is executed. At the following step 310, the damping force of the shock absorbers S1L, S1R, S2L and S2R is altered to the weaker state.

At step 320, a vertical acceleration alpha of the vehicle body is inputted from the acceleration sensor G. The program cycle then proceeds to the decision point 330 at which the vertical acceleration alpha is compared with a reference acceleration alpha0. Here, the acceleration alpha is downwardly positive, and the reference acceleration alpha0 is 0.01 g in this embodiment, where g is the acceleration of the gravity. If alpha is determined to be greater than or equal to the reference acceleration alpha0, the program returns to step 320, where the acceleration alpha is again inputted. On the contrary, if alpha is determined to be less than alpha0, it is judged that the suspension is contracted over an allowable vibration level, and the program cycle proceeds to step 335 where the vertical acceleration alpha is inputted in the same manner as step 320. At the following step 340, the acceleration alpha is differentiated to obtain an accelerating rate j which is a derivative of the acceleration. The program cycle then proceeds to the decision point 350 at which the accelerating rate j is compared with a reference accelerating rate j0 of the acceleration. In this embodiment, since a time point at which the vertical acceleration alpha attains local minimum is to be determined at steps 335, 340 and 350, the reference accelerating rate j0 is set to zero. If the accelerating rate j is determined to be substantially the same value as the reference accelerating rate j0, i.e., $j \approx j0$, it is judged that the acceleration alpha has attained minimum, and the program proceeds to the step 360, and on the contrary, if not, it is judged that the acceleration alpha has not yet attained minimum, and the program returns to steps 335 and 340.

At step 360, a delay processing (3) is executed. Namely, the ECU 4 waits to alter the damping force to a stronger state for a predetermined delay time interval tg. The damping force is actually altered to the stronger state after an effective delay time interval th has elapsed since the time point at which the vertical acceleration alpha attained the minimum. The effective delay time interval th is calculated by an equation (3):

$$th = tg + ta \qquad (3)$$

tg . . . a delay time interval ta . . . an actuator operation time period for altering the damping force The above effective delay time interval th varies depending upon the vehicle and the reference acceleration alpha0. In this embodiment, the time period ta is 60 msec and the delay time interval tg is set to 100 msec so that the effective delay time interval th is 160 msec.

When the time is counted by the timer 4m and the delay time interval tg has elapsed, the program proceeds to step 370 where the damping force of the shock absorbers S1L, S1R, S2L and S2R is altered to the stronger state. At step 380, another delay processing (4) is executed. After the delay processing (4) at step 380, the program returns to step 310 where the damping force is restored to a weaker state. Hereafter, the above steps 310 to 370 are repeatedly executed.

The delay processing (4) is explained in detail. The ECU 4 waits to restore the damping force to the weaker state for a predetermined delay time interval tk. The damping force is actually restored to the weaker state when the body height has returned to the mean value, i.e., when an effective delay time interval tλ has elapsed since the time point at which the damping force was altered to the stronger state. The effective delay time interval tλ is calculated by an equation (4);

$$t\lambda = tk + ta \quad (4)$$

tk . . . a delay time interval
ta . . . an actuator operation time period for altering the damping force The effective delay time interval tλ varies depending upon the damping force of the shock absorbers and other factors, and is previously set to 340 msec in this embodiment.

Figure 15A:
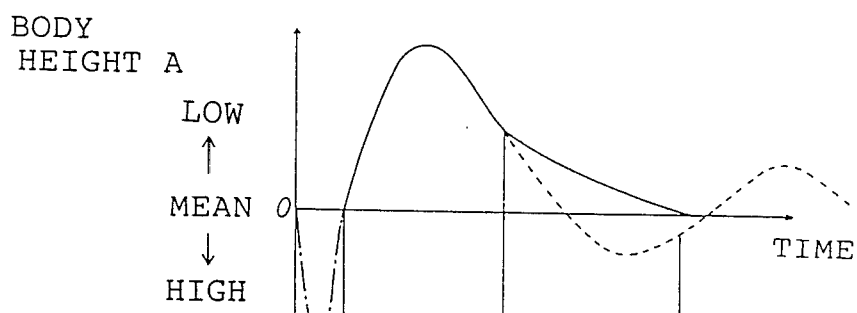
Figure 15B:
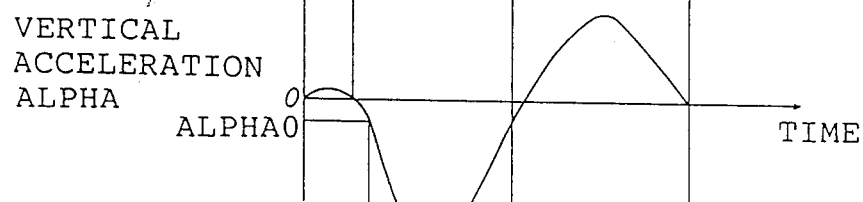
Figure 15C:
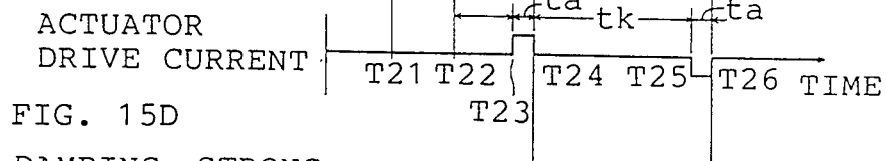
Figure 15D:
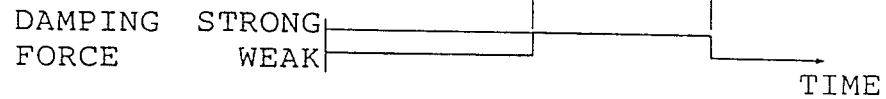
Figure 15E:
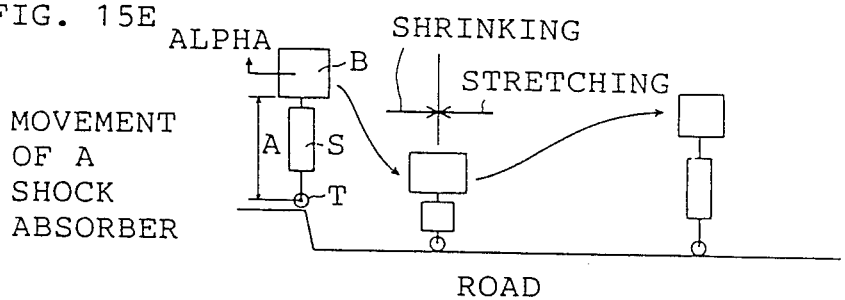

One example of the shock absorber control described above is now explained based on timing charts of FIGS. 15A, 15B, 15C and 15D and an explanatory view of FIG. 15E. FIG. 15E shows the relationship between a shock absorber S, provided between a wheel T and a body B, and the road surface. When the wheel T rides through a dip, at first, the unsprung mass of the vehicle, i.e., the wheel T falls into the dip and the body height (distance between the body B and the wheel T) is changed as shown in a dashed line of FIG. 15A. At first, the acceleration alpha is downwardly applied on the body, which is defined to be a positive value in this case. Shortly after that, spring mass of the vehicle, i.e., the body B, sinks down and the acceleration alpha becomes negative. T21 of FIG. 15C is a time point at which the acceleration alpha is decreasing to be equal to the reference acceleration alpha0. After the time point T21, the acceleration is gradually increasing in the negative direction, and at a time point T22, it attains minimum. At this time, the shock absorbers S1L, S1R, S2L and S2R are in the most shrunk state and then starts to stretch. At a time point T23 after the delay time interval tg has elapsed since the time point T22, the damping force alteration actuators A1L, A1R, A2L and A2R are activated. At a time point T24 after the time period ta has elapsed since the time point T23, the damping force of the shock absorbers S1L, S1R, S2L and S2R is altered to the stronger state. In other words, T24 is a time point after the effective delay time interval th has elapsed since the time point T22 at which the acceleration alpha attained minimum.

If the damping force is not changed and is remained in the weaker state, the body height A is largely changed as shown in a dashed line. Since the damping force was altered to the stronger state at the time point T23, the body height vibration is subsided as shown in a full line. At the time point T25 after the delay time interval tk has elapsed since the time point T24, the damping force alteration actuators A1L, A1R, A2L and A2R are activated, and at a time point T26 after the time period ta has elapsed since the time point T25, the damping force is altered to the weaker state. Hereafter, when the acceleration alpha becomes less than the reference acceleration alpha0, the damping force is altered to a stronger state after the delay time interval tk has elapsed since the time point at which the acceleration alpha attained minimum, and is restored after the effective delay time interval tλ has elapsed.

In this embodiment, the acceleration sensor G, the ECU 4 and the process steps 320 and 335 executed by the ECU 4 function as the vertical moment detection means M1. The shock absorbers S1L, S1R, S2L and S2R and the damping force alteration actuators A1L, A1R, A2L and A2R function as the damping force alteration means M2. The ECU 4 and the process steps 330, 340, 350, 360 and 370 executed by the ECU 4 function as the control means M3.

As described above in detail, in this embodiment, when the acceleration alpha, inputted from the acceleration sensor G, becomes less than the reference acceleration alpha0, the time point T22 at which the acceleration alpha attains minimum is determined based on the accelerating rate j of the body movement. At the time point T24 after the effective delay time interval th has elapsed since the time point T22, the damping force is altered to the stronger state, and is restored to the weaker state after the effective delay time interval tλ has elapsed. Thus, while the effective delay time interval th elapses from the time point at which the accelerating rate j was zero, i.e., the body height A was at the maximum, the damping force is remained in the weaker state so as to hasten the body height change. After the effective delay time interval th has elapsed, the damping force is altered to the stronger state so as to subside the body height vibration. Since the large body height change can be controlled within a half cycle of the body height vibration and the body height can return to the mean value promptly, the ride comfort is maintained.

In this embodiment, only when the vertical acceleration alpha becomes less than the reference acceleration alpha0, the damping force is altered to the stronger state within a half cycle time of the body height vibration so as to reduce the vibration. Namely, the damping force is not altered in response to such as a vibration of unsprung mass with relatively small acceleration, thus improving the durability of the shock absorbers S1L, S1R, S2R and S2R and the damping force alteration actuators A1L, A1R, A2L and A2R.

Figure 16:
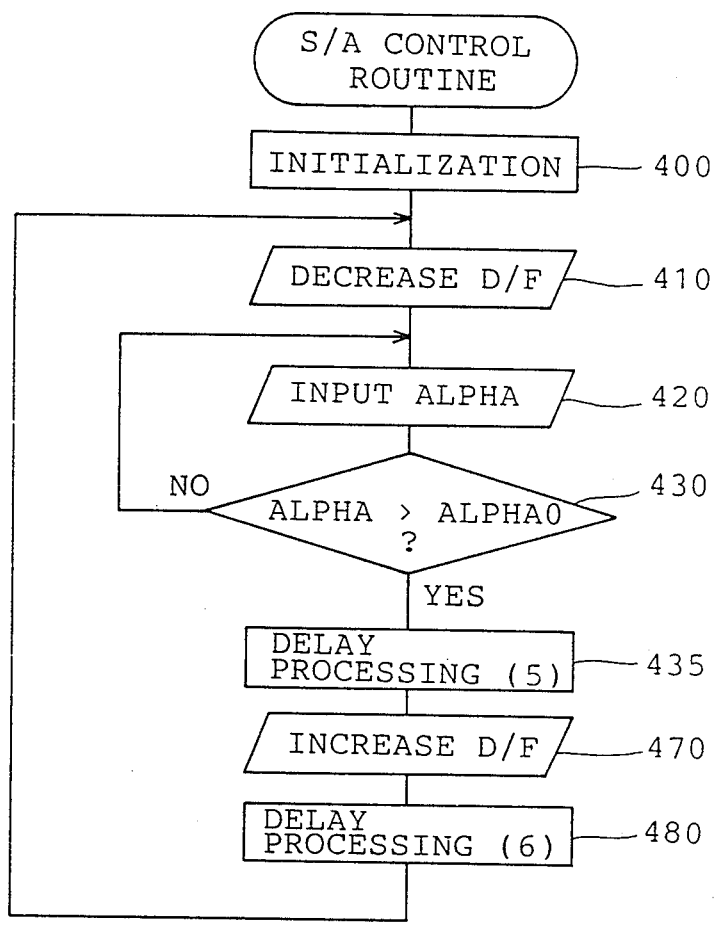
FIG. 16 is a flow chart of a shock absorber (S/A) control routine for the fourth embodiment.

A fourth embodiment is now explained. In the fourth embodiment, although the shock absorber control routine is different from that of the third embodiment, other features are the same as the third one. The shock absorber control routine of the fourth embodiment is explained based on a flow chart of FIG. 16. The process steps 400, 410, 420, 430, 470 and 480 of the fourth embodiment corresponds to the process steps 300, 310, 320, 330, 370 and 380 of the third embodiment. In this embodiment, a delay processing (5) at step 435 has a delay time interval longer than that of the delay processing (3) of the third embodiment. The program enters the routine at step 400 where the initialization is executed. At step 410, the damping force of the shock absorbers S1L, S1R, S2L, S2R is altered to a weaker state, and at step 420, an acceleration alpha is inputted. The program cycle proceeds to the decision point 430 at which the the acceleration alpha is compared with a reference acceleration alpha0. If alpha<alpha0, the program proceeds to step 435 and if not, returns to step 420.

At step 435, the delay processing (5) is executed. Namely, the ECU 4 waits to alter the damping force to a stronger state for a predetermined delay time interval tm. The damping force is actually altered to the stronger state after an effective delay time interval tn has elapsed since the time point at which the acceleration alpha was determined to become less than the reference acceleration alpha0. The effective delay time interval tn is calculated by an equation (5):

$$tn = tm + ta \qquad (5)$$

tm . . . a delay time interval
ta . . . an actuator operation time period for altering the damping force The above effective delay time interval tn varies depending upon the vehicle and is set to 300 msec in this embodiment.

When the time is counted by the timer $4m$ and the delay time interval tm has elapsed, the program proceeds to step 470 where the damping force of the shock absorbers S1L, S1R, S2L and S2R is altered to the stronger state. At the following step 480, a delay processing (6), which is the same as the delay processing (4) of the third embodiment, is executed. The program step then returns to step 410, and hereafter, the above-mentioned process steps are repeatedly executed.

One example of the shock absorber control described above is now explained based on timing charts of FIGS. 17A, 17B, 17C and 17D and an explanatory view of FIG. 17E. In the fourth embodiment, not the same as the third embodiment, at a time point T31 after the effective time interval tn has elapsed since a time point T21 at which the acceleration alpha becomes less than the reference acceleration alpha0, the damping force of the shock absorbers S1L, S1R, S2L and S2R is altered to a stronger state. Namely, in the fourth embodiment, the time point T31 at which the damping force is altered to the stronger state is determined by using the fact that the natural vibration cycle of the vehicle body is almost constant indifferent to its amplitude.

As described above in detail, in the fourth embodiment, if the vertical acceleration alpha, inputted from the acceleration sensor G, is determined to be less than the reference acceleration alpha0, the damping force is altered to the stronger state after the effective delay time interval tn has elapsed. The altered damping force is restored to the weaker state after the effective delay time interval tλ has elapsed. For this reason, although the fourth embodiment has the effect similar to the third embodiment, the feature of the fourth one is simpler than the third one.

Figure 18A:
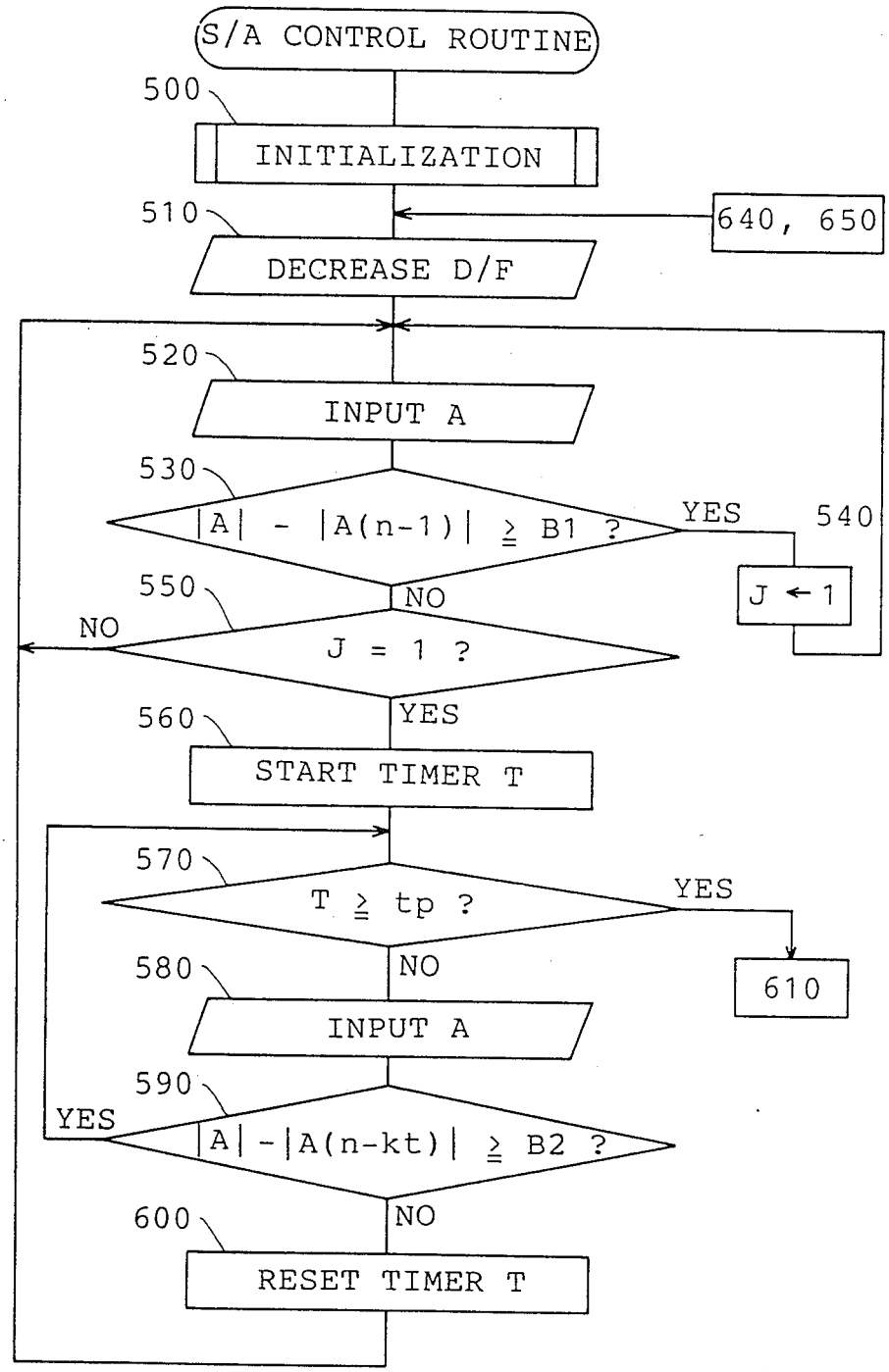
FIGS. 18A and 18B are flow charts integrally of a shock absorber (S/A) control routine for the fifth embodiment.
Figure 18B:
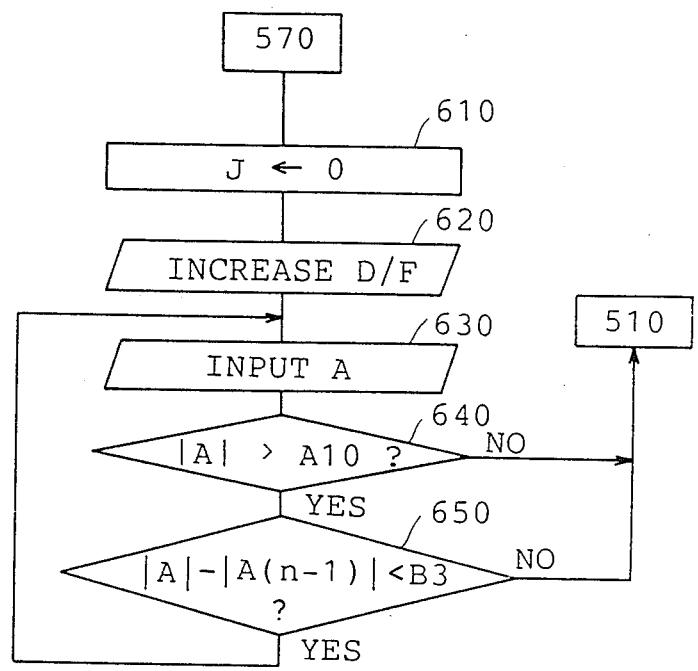

A fifth embodiment of the invention is now explained. Although the shock absorber control routine of the fifth embodiment executed by the ECU 4 is different from that of the first embodiment, other features are the same as the first one. The shock absorber control routine is explained based on a flow chart of FIG. 18. The process steps 500, 510, 520, 620 and 630 of the fifth embodiment corresponds to the process steps 100, 110, 120, 170 and 180 of the first embodiment.

The program enters the routine at step 500 where the initialization is executed. At step 510, the damping force of the shock absorbers S1L, S1R, S2L and S2R is altered to a weaker state. At the following step 520, a body height A is inputted, and the program then proceeds to the decision point 530 at which the difference between the absolute value of the current body height A and the absolute value of a body height A(n−t) detected before is compared with a reference value B1. In this embodiment, the reference value B1 is 0 mm. If $|A| - |A(n-t)| \geq B1$, it is judged that the body height A is becoming distant from the mean body height, and the program proceeds to step 540 where a flag J is set to 1, and then returns to step 520. On the contrary, if $|A| - |A(n-t)| < B1$, it is judged that the body height A is returning to the mean body height, and the program proceeds to the decision point 550 at which the flag J is compared with 1. If J is determined to be equal to 1, the program proceeds to step 560 and if not, returns to step 520. At steps 520 through 550, a time point at which the body height A starts to return to the mean body height, i.e., at which the absolute value of A attains maximum, is determined.

At step 560, the timer $4m$ starts counting and at the decision point 570, the value T in the timer $4m$ is compared with a delay time interval tp. The delay time interval tp is set to 100 msec in this embodiment, the same as the delay time interval tb of the first embodiment.

If the answer is no at the decision point 570, the program cycle proceeds to step 580 where the body height A is inputted. At the following decision point 590, the difference between the absolute value of the current body height A and the absolute value of a body height A(n−kt) detected 40 milliseconds before is compared with a reference value B2. In this embodiment, the reference value B2 is set to 0 mm. If $|A| - |A(n-kt)| \geq B2$, it is judged that the body height A is returning to the mean body height, and the program returns to the decision point 570, and if not, it is judged that the body height A is again becoming distant from the mean body height, and the program proceeds to step 600 where the timer is reset to zero and returns to step 520.

On the other hand, if the answer is yes at step 570, the program proceeds to step 610 where the flag J is reset to zero. At the following step 620, the damping force of the shock absorbers S1L, S1R, S2L and S2R are altered to the stronger state. At step 630, the body height A is inputted, and the program cycle proceeds to the decision point 640 at which the absolute value of A detected at step 630 is compared with a reference value A10. In this embodiment, the reference value A10 is set to 5 mm. If the absolute value A is determined to be greater than the reference value A10, it is judged that the body height A has not yet returned to the means body height and the program proceeds to the decision point 650. If not, it is judged that the body height A has already returned to the mean body height and the program returns to step 510 where the damping force is altered to the weaker state.

At the decision point 650, the difference between the absolute value of the current body height A and the absolute value of the body height A(n−t) detected before is compared with a reference value B3. In this embodiment, the reference value B3 is set to zero. If $|A| - |A(n-t)| < B3$, the program step returns to step 630, where the body height A is again inputted. On the contrary, if $|A| - |A(n-t)| \geq B3$, it is judged that the body height is again becoming distant from the mean body height by external force and the program returns to step 510 where the damping force is altered to the weaker state so as to absorb the shock. Hereafter the above process steps are repeatedly executed.

One example of the shock absorber control described above is now explained based on timing charts of FIGS. 19A, 19B and 19C. When a wheel rides over a bump so that a vibration of unsprung mass, the wheel, is generated, the body height A is largely changed, becomes distant from the mean body height and is vibrated with a shorter cycle time. If the body height A is changed according to the vibration of unsprung mass as shown in FIG. 19A, it is detected that the body height is returning to the mean body height at a time point T41. It is then determined if the body height A again becomes distant from the mean body height while a delay time interval tp elapses from the time point T41. Since the cycle time of the vibration of unsprung mass is well shorter than the spring mass, as shown in FIG. 19A, the body height A generally becomes distant from the mean value in the delay time interval tp. Therefore, the damping force is kept in the weaker state in that case in order to maintain the ride comfort.

When a wheel rides over a bump or the vehicle attitude is abruptly changed in response to the driving condition, a vibration of sprung mass is generated. In this case, the body height A is largely changed and becomes distant from the mean value. At a time point T42, it is detected that the body height A changes in the direction of approaching to the mean value. The body height A does not change in the direction of becoming distant from the mean value for the delay time interval tp between the time points T43 and T44. Thus, at the time point T43, the damping force alteration actuators A1L, A1R, A2L and A2R are activated. At a time point T44 after the time period ta has elapsed since the time point T43, the damping force of the shock absorbers S1L, S1R, S2L and S2R is actually altered to the stronger state.

If the damping force is not altered but remains in the weaker state, the body height A largely changes as shown in a dashed line. Since, however, the damping force was altered to the stronger state at the time point T44, the body height vibration is subsided as shown in a full line. After that, if the body height A again changes in the direction of becoming distant from the mean value by an external force, at the time point T46, the difference between the absolute value of A and the absolute value of $A(n-t)$ is determined to become distant from the mean value, and the damping force alteration actuators are activated. At a time point T47 after the time period ta has elapsed since the time point T46, the damping force is actually altered to the weaker state so as to reduce the shock caused by the external force.

In this embodiment, the ECU 4 and the process steps 530 through 620 executed to the ECU 4 function as the control means M3.

As described above in detail, in this embodiment, if the body height A is approaching to the mean value while the delay time interval tp elapses from the time point at which the body height A started to approach to the mean value, the ECU 4 outputs a command for altering the damping force to the stronger state. As a result, the vibration of the vehicle body does not continue so that the body height can be returned to the mean value promptly and the ride comfort can be maintained. In this embodiment, the vibration of the vehicle body is judged not from the amount of the body height change but from the detection thereof. Namely, when the body height is generally changed according to the weight change of a passenger or a load or according to cornering, the vibration of the vehicle body is not detected in this embodiment, thus preventing unnecessary alteration of the damping force.

Furthermore, in this embodiment, if the body height A again changes in the direction of becoming distant from the mean value after the damping force was altered to the strong state, the damping is altered to the weaker state, thus providing the ride comfort. Since the unnecessary alteration of the damping force in the vibration of unsprung mass is prevented, the durability of the shock absorbers S1L, S1R, S2R and S2R and the damping force alteration actuators A1L A1R, A2L and A2R can be improved.

Although the invention has been described with reference to specific embodiments thereof, it will be apparent that numerous changes and modifications may be made therein without departing from the scope of the invention. It is, therefore, to be understood that it is not intended to limit the invention to the embodiment shown but only by the scope of the claims which follow.

What is claimed is:

1. A shock absorber controller for a vehicle suspension comprising:
    vertical movement detection means for detecting a vertical movement of a body of the vehicle;
    control means for delaying generation of a damping force alteration signal until a time point when the body is moving toward a mean position; and
    damping force alteration means responsive to the damping force alteration signal for increasing a damping force of each shock absorber.

2. A shock absorber controller for a vehicle suspension according to claim 1, wherein:
    the vertical movement detection means comprise a body height detection means for generating a body height signal; and
    the control means delays generation of the damping force alteration signal until a time point within a period in which the body height signal change is going toward a mean body height, the mean body height corresponding to the mean position of the body.

3. A shock absorber controller for a vehicle suspension according to claim 2, wherein the control means sets the time point at a predetermined period after the body height signal exceeds a first predetermined range including the mean body height, the period being determined to be no greater than a semi-cycle period of the resonant vibration of the sprung mass of the vehicle.

4. A shock absorber controller for a vehicle suspension according to claim 2 wherein the control means sets the time point at a predetermined period after the body height signal attains a first local maximum or first local minimum since the body height signal exceeds the first predetermined range but before the body height signal is equal to the mean body height.

5. A shock absorber controller for a vehicle suspension according to claim 4, wherein the control means determines that the body height has attained the first local maximum or the first local minimum when a difference of sequent two detected body height signals is less than a predetermined small value.

6. A shock absorber controller for a vehicle suspension according to claim 1, wherein:
the vertical movement detection means comprise an acceleration detection means for detecting a vertical acceleration of the body and for generating an acceleration signal; and
the control means delays generation of the damping force alteration signal until a predetermined period after the acceleration signal exceeds a predetermined range including zero.

7. A shock absorber controller for a vehicle suspension according to claim 6, wherein:
the control means delays generation of the damping force alteration signal until another predetermined period after the acceleration signal attains a first local maximum or first local minimum after the acceleration signal exceeds the predetermined range.

8. A shock absorber controller for a vehicle suspension according to claim 7, wherein the control means determines that the acceleration signal has attained the first local maximum or the first local minimum when a difference of sequent two detected acceleration signals is less than a predetermined small value.

9. A shock absorber controller for a vehicle suspension according to claim 1, wherein:
the vertical movement detection means comprise a body height detection means for generating a body height signal; and
the control means delays generation of the damping force alteration signal until a predetermined period after the body height signal attains a local maximum or a local minimum but before the body height signal is equal to a mean body height, the mean body height corresponding to the mean position of the body.

10. A shock absorber controller for a vehicle suspension according to claim 9, wherein the control means delays generation of the damping force alteration signal until the predetermined period after the body height signal attains the local maximum or the local minimum if the body height signal change is going toward the mean value of the body height during the predetermined period.

11. A shock absorber controller for a vehicle suspension according to claim 9, wherein the control means determines that the body height has attained the local minimum or the local minimum when an absolute value of the detected body height first decreases.

* * * * *